United States Patent [19]
Ratzlaff et al.

[11] Patent Number: 5,839,362
[45] Date of Patent: Nov. 24, 1998

[54] SINGLE CYLINDER HYDRAULIC TENSION CONTROL SYSTEM FOR ROUND BALERS

[75] Inventors: Howard J. Ratzlaff, Hesston; J. Dale Anderson, Canton; Ferol S. Fell, Newton, all of Kans.

[73] Assignee: Hay & Forage Industries, Hesston, Kans.

[21] Appl. No.: 897,466

[22] Filed: Jul. 21, 1997

[51] Int. Cl.$^6$ .................................................. A01F 15/07
[52] U.S. Cl. ................................ 100/88; 53/118; 56/341
[58] Field of Search .................................. 100/5, 87–89; 53/118, 587; 56/341, 343

[56] References Cited

U.S. PATENT DOCUMENTS

| | | | |
|---|---|---|---|
| 4,759,279 | 7/1988 | Frerich | 100/88 |
| 5,134,839 | 8/1992 | Clostermeyer et al. | 100/88 |
| 5,367,865 | 11/1994 | Jennings et al. | 56/341 |
| 5,450,704 | 9/1995 | Clostermeyer | 53/118 |
| 5,519,990 | 5/1996 | Rodewald et al. | 100/88 |

*Primary Examiner*—Stephen F. Gerrity
*Attorney, Agent, or Firm*—Hovey, Williams, Timmons, & Collins

[57] ABSTRACT

A round baler includes a tension assembly for applying pressure evenly across the periphery of the bale as it grows within the baling chamber. The tension assembly includes a rotatable torque tube extending between the sidewalls and only one tensioning mechanism, such as a hydraulic cylinder, adjacent one of the sidewalls of the baler for supplying a yieldable resistance load in opposition to torsional loads on the torque tube. A load transferring member extends inwardly from the one sidewall to operably connect the single tensioning mechanism to the torque tube at a location spaced between the sidewalls and thereby transfer the loads between the mechanism and tube.

22 Claims, 4 Drawing Sheets

SINGLE CYLINDER HYDRAULIC TENSION CONTROL SYSTEM FOR ROUND BALERS

BACKGROUND OF THE INVENTION

1. Field of the Invention

The present invention relates generally to round balers and, more particularly, to an improved tension control system for evenly applying pressure against the periphery of the bale as it is formed within the baling chamber.

2. Discussion of Prior Art

As well appreciated by those of ordinary skill in the art, the application of pressure evenly across the periphery of the bale during the baling cycle improves bale quality and promotes bale formation. Accordingly, round balers have traditionally employed various structure for applying pressure against the periphery of a bale as it is formed within the baling chamber. Such structure is often referred to as a tension assembly and typically includes a torque tube rotatably mounted to the sidewalls of the baler, a pair of cranks connected to the opposite ends of the torque tube outside of the sidewalls, and a pair of tensioning mechanisms connected between the cranks and the sidewalls for restricting rotation of the torque tube. In most cases, conventional tensioning mechanisms comprise a pair of hydraulic cylinders connected in a parallel arrangement to a circuit having a flow restrictor, such as a relief valve, so that extension or retraction of the cylinders is yieldably restricted, although springs are also often utilized to restrict rotation of the torque tube. In any case, the structure carried by the torque tube is consequently restricted from swinging in a direction corresponding to bale growth, and accordingly, the structure directly or indirectly applies pressure against the bale as it is formed. For example, when the tension assembly comprises the slack control assembly of a belt-type round baler that controls the amount of slack paid out to the belts as the bale grows, the hydraulic cylinders serve to maintain tension on the belts so that the belts apply pressure against the periphery of the bale.

It will be appreciated that the pressure applied against the bale by the tension assembly must be even across the width of the baling chamber, otherwise the bale will likely have inconsistent crop density and an abnormal shape. In the past, uniform application of pressure has been ensured by a pair of cylinders disposed on opposite sides of the baler to restrict rotation of the torque tube equally at its opposite ends. Of course, if rotation of the torque tube is restricted at only one end, the opposite end of the torque tube will likely twist relative to the one end causing uneven application of pressure across the periphery of the bale. Accordingly, conventional tension assemblies require the use of two tensioning mechanisms, such as hydraulic cylinders, and two sets of structure (e.g., each set including a crank and a mounting bracket) for connecting the mechanisms between the respective baler sidewalls and opposite ends of the torque tube. However, this duplicity increases baler complexity, maintenance, weight and cost.

OBJECTS AND SUMMARY OF THE INVENTION

Responsive to these and other problems, an important object of the present invention is to provide a round baler with structure for evenly applying pressure against the periphery of the bale as it is formed. Another important object of the present invention is to reduce the cost and complexity of a round baler having structure for applying such pressure. Specifically, an object of the present invention is to provide a tension assembly for imparting pressure evenly across the periphery of the bale as it is formed, wherein the assembly includes only one tensioning mechanism.

In accordance with these and other objects evident from the following description of a preferred embodiment of the invention, the round baler includes a tension assembly having only one tensioning mechanism adjacent one of the baler sidewalls for yieldably resisting rotation of the torque tube so as to impart pressure against the periphery of the bale. Accordingly, the present invention eliminates one of the tensioning mechanisms normally used in conventional assemblies, thereby reducing the cost and complexity of the baler. Further, a load-transferring member operably connects the single tensioning mechanism to the torque tube at a location spaced between the sidewalls. Because tension assemblies typically include a pair of laterally spaced arms projecting from the torque tube, is important that the connection between the load-transferring member and torque tube be spaced between the sidewalls so that swinging of each of the arms is equally resisted by the single tensioning mechanism. Of course, it is important that swinging of the arms be equally resisted, otherwise the pressure applied to the bale by structure carried on the arms, such as rolls, tends to be uneven across the width of the baler.

Preferably, the torque tube comprises a pair of sections extending inwardly from respective ones of the sidewalls and being connected to the load-transferring member at locations spaced equally from the sidewalls. The preferred load-transferring member is received within the tubular sections, yet is spaced sufficiently inwardly from the sections to allow slight torsional twisting of the sections between the locations and sidewalls. If desired, the single tensioning mechanism may comprise a hydraulic cylinder connected to a circuit having a flow restrictor, such as a relief valve, for yieldably restricting extension or retraction of the cylinder.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
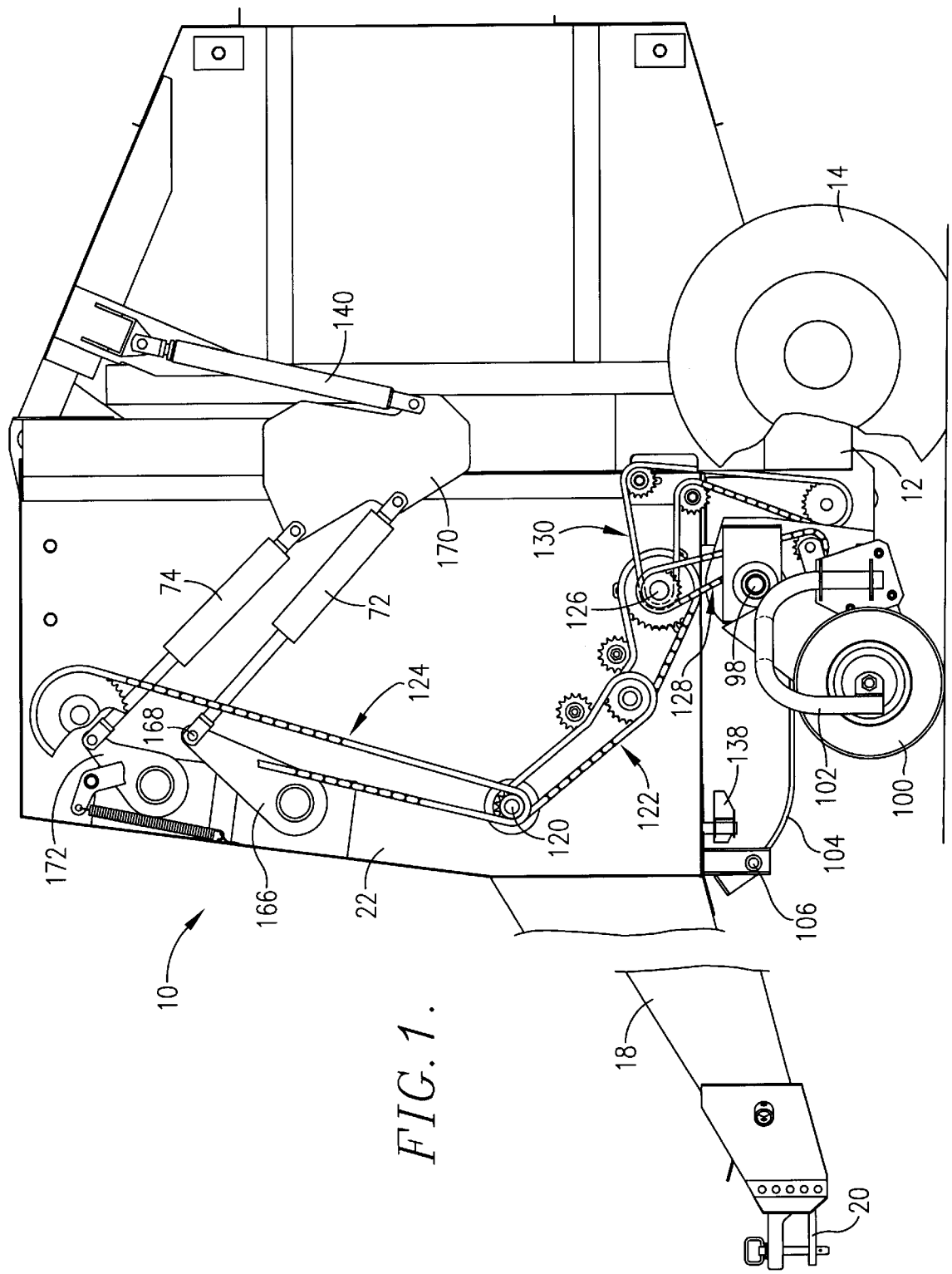
FIG. 1 is a left side elevational view of a round baler incorporating the principles of the present invention.

Turning now to the drawings, the round baler 10 selected for illustration includes a chassis 12 that is supported for travel by a pair of ground wheels 14 and 16. A tongue 18 projects forwardly from the chassis 12 and has a suitable hitch 20 at its front end for connecting the baler to a towing tractor (not shown). A pair of laterally spaced apart sidewalls 22 and 24 are mounted on the chassis 12 and project upwardly therefrom. The space between the two sidewalls 22 and 24 comprises the area in which the baling and wrapping cycles are carried out, as will be explained below.

The baler 10 has a number of transverse rolls and belts that cooperate with the sidewalls 22,24 to define an internal baling chamber 26 that assumes different shapes and sizes throughout the bale-forming cycle. As illustrated best in FIG. 3, the transverse rolls include a lower drive roll 28, a lower idler roll 30, an upper drive roll 32 and idler rolls 34, 36, 38, 40, 42, 44, 46, 48, 50, 52 and 54. A series of endless, flexible, side-by-side belts 56 are looped around the rolls 28–54 in the pattern illustrated in FIG. 3. The drive roll 28 and the idler roll 46 are located at the bottom of the baling chamber 26 and are spaced apart in a generally fore-and-aft direction to define a noncompressive, chamber inlet opening 58 therebetween. The belts 56 are looped under the drive roll 28, under the rear idler roll 46, and over the large upper idler roll 52 so that the belts 56 present a pair of generally vertical or upright belt stretches 60 and 62 when the baling chamber 26 is empty at the beginning of a baling cycle as illustrated in phantom lines in FIG. 3.

A twin guide roll assembly 64 having a pair of vertically swingable arms 66 and 67 (the left arm 66 being shown only in FIGS. 4 and 5) located inside the baler adjacent the two walls 22 and 24 supports the two idler rolls 50 and 54 in a position to directly overlie the bale during its formation within the chamber 26. The rolls 50 and 54 are spaced apart by a distance which is much less than the width of the inlet opening 58, and the vertical belt stretches 60 and 62 are confined between the rolls 50 and 54 so that the rolls 50,54 serve to converge the belt stretches 60,62 toward one another as the rolls 50,54 are approached. Since the rolls 50,52 are essentially directly above the inlet opening 58, the rolls 50,54 cause the chamber 26 to assume a generally vertical, triangular configuration when the chamber 26 is empty as illustrated in phantom in FIG. 3 and the arms 66,67 are down as also illustrated in phantom in FIG. 3. With the drive rolls 28 and 32 rotating clockwise viewing FIG. 3, this imparts a downward motion to the front belt stretch 60 and an upward motion to the rear belt stretch 62 when the chamber 26 is empty at the beginning of a new bale forming cycle. A slack control arm assembly 68 at the upper front corner of the baler 10 includes a pair of vertically swingable arms 70 (only one being shown) that support the idler rolls 34 and 38 to control the amount of slack paid out to the belts 56 as the bale grows within the chamber 26.

As will be described further hereinbelow, the twin guide roll assembly 64 and slack control assembly 68 serve to impart pressure against the periphery of the bale in accordance with the principles of the present invention. Particularly, each assembly 64 and 68 includes only a single hydraulic cylinder 72 and 74, respectively, on the left side of the machine for tensioning the assembly and thereby imparting pressure against the periphery of the bale during the baling cycle.

The baling chamber 26 is obviously located well above and off the ground. Therefore, some means must be provided for picking up crop materials as the baler moves across the field and for delivering the picked-up materials into the chamber 26. In the illustrated embodiment, the baler 10 is constructed in accordance with the principles of open throat, vertical chamber baling, such that the incoming crop material is not to be subjected to any significant compression until it passes through the inlet opening 58 and is fully received within the baling chamber 26. Thus, that part of the crop flow path upstream from the chamber 26 is open and non-compressive and may be described as an open throat 76 (see FIG. 3) through which the picked-up crop material passes on its way to the baling chamber 26.

In the illustrated embodiment the crop material is picked up off the ground by a standard resilient rotary rake tine assembly 78 located below and forwardly of the chamber 26 and its inlet opening 58. The assembly 78 is positioned along the lower portion of the throat 76 and cooperates with the lower drive roller 28 in helping to define the throat 76. The resilient rake tines 80 of the assembly 78 describe a somewhat circular path of travel as shown in phantom lines in FIG. 3, although the tines 80 actually are cam-operated and are caused to retract along the rear stretch of their path of travel.

If the rake tine assembly 78 selected for use is wider than the chamber 26 in a direction transverse to the path of travel of the machine, the picked-up material must be converged toward the center by center-gathering stub augers 82 (only one being shown in FIG. 3) or the like before being delivered into the chamber 26. One suitable stub auger construction for accomplishing this function is disclosed in co-pending application Ser. No. 08/731,764, filed Oct. 18, 1996 and titled "Down Turning Stub Augers on Wide Pick-Up for Round Balers". If the rake tine assembly 78 is the same width as the chamber 26, center-gathering mechanism is not needed.

A rigid tooth feeder 84 is positioned below and in vertical alignment with the inlet opening 58 between the resilient rake tine assembly 78 and the lower idler roll 46 along the lower stretch of the throat 76. Feeder 84 is spaced below the lower drive roll 28 and helps to define the throat 76. In the preferred embodiment, the feeder 84 takes the form of a fork 86 having a series of transversely spaced, rigid teeth 88 that move in a generally kidney-shaped path of travel illustrated in phantom lines in FIG. 3. The teeth 88 project into the throat 58 during a stuffing stroke along the upper half of their path of travel and retract down out of the throat 76 during a return stroke along the lower half of their path of travel. A slotted ramp 90 spanning the distance between the resilient tine assembly 78 and the lower idler roll 46 provides a floor for the throat 58 in the vicinity of the rigid tooth feeder 84 and serves as a stripper plate through which the teeth 88 may retract to release the crop material at the rear end of the path of travel of the teeth 88.

Figure 3:
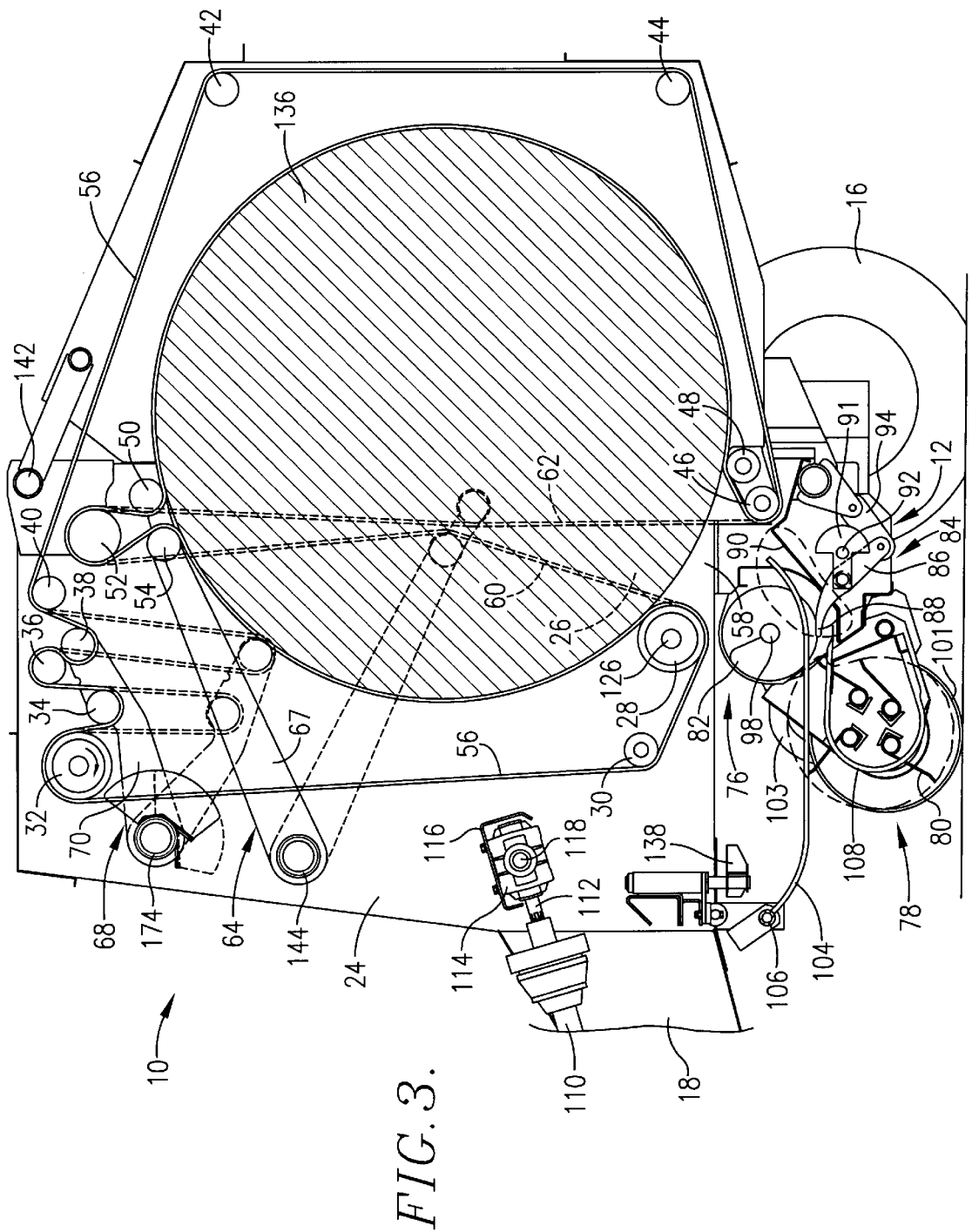
FIG. 3 is a fragmentary, left side elevational view of the baler with the near sidewall removed and with a full size bale shown therein, the phantom lines in the bale chamber area indicating the condition of the bale chamber and related components when the chamber is empty at the beginning of a new baling cycle.

The fork 86 is pivotally supported by a rotating carrier 91 that rotates continuously about a transverse horizontal axis 92. The fork 86 is connected near its mid-point to the carrier 91 and has its lower extended end pivotally connected to a control link 94 pivotally coupled with the chassis 12. Thus, although the carrier 91 rotates in a circular path of travel, the fork 86 is constrained to move in its kidney-shape path of travel as illustrated. As shown in FIG. 3, the idler rolls 46 and 48 cooperate with the ramp 90 when the bale in chamber 26 grows larger than a starting core to define an eased inlet for material entering the chamber 26 as disclosed in co-pending application Ser. No. 08/731,395, filed Oct. 18, 1996, titled "Eased Inlet Tailgate Roll Arrangement for Variable Chamber Round Baler".

Contrary to prior open throat, vertical chamber constructions, the baler 10 has no starter roll located in the chamber 26 behind the lower drive roll 28. However, also contrary to prior open throat vertical chamber constructions, the baler 10 has the rigid tooth feeder 84 disposed below the open bottom of the chamber 26 in vertical alignment with the inlet opening 58. Consequently, the rigid tooth feeder 84 is positioned for projecting crop materials into the chamber 26 during successive stuffing strokes, whether such materials comprise only incoming materials received from the resilient tine assembly 78 or also materials that may have fallen down out of the chamber 26 during the early stages of bale core starting. The no starter roll construction of the illustrated baler 10 is the subject of copending, contemporaneously filed application Ser. No. 08/896,720, filed Jul. 18, 1997, titled "Vertical Chamber, Open Throat Round Baler Having No Starter Roll".

In the illustrated embodiment, the resilient rake tine assembly 78 is mounted on the chassis 12 for up and down swinging movement about a transverse axis 98 (FIGS. 1 and 2) which coincides with the axis of rotation of the stub augers 82. Gauge wheels 100 and 101 secured to the resilient rake tine assembly 78 by inverted, generally U-shaped arms 102 and 103 ride along the ground to cause the resilient tine assembly 78 to swing up or down as necessary to accommodate changes in ground contour. It will be noted that in the illustrated embodiment, the stub augers 82 and the rigid tooth feeder 84 do not pivot with the resilient tine assembly 78 but are instead mounted in fixed positions on the chassis 12. However, it is within the scope of the present invention to have all three of the components comprising the rake tine assembly 78, the rigid tooth feeder 84 and the stub augers 82 constructed as part of a header unit swingably attached to the chassis 12. In the illustrated embodiment, the gauge wheels 100 and 101 are attached to the resilient tine assembly in the manner disclosed and claimed in co-pending application Ser. No. 08/733,758, filed Oct. 18, 1996, and titled "Over-the-Top Support Arm for Pick-Up Gauge Wheel of a Baler".

As perhaps best shown in FIG. 3, the baler 10 is provided with a standard windguard 104 overlying the resilient rake tine assembly 78. The windguard 104 is pivoted to the chassis 12 at pivot 106 and is biased by gravity to lie against the wrapper 108 of the resilient tine assembly 78 and the ramp 90 associated with the rigid tooth feeder 84. As incoming crop material flows through the throat 76, the windguard 104 is raised off the wrapper 108 and the ramp 90 by the moving crop material. However, the windguard 104 provides no significant compaction of the crop material.

Figure 2:
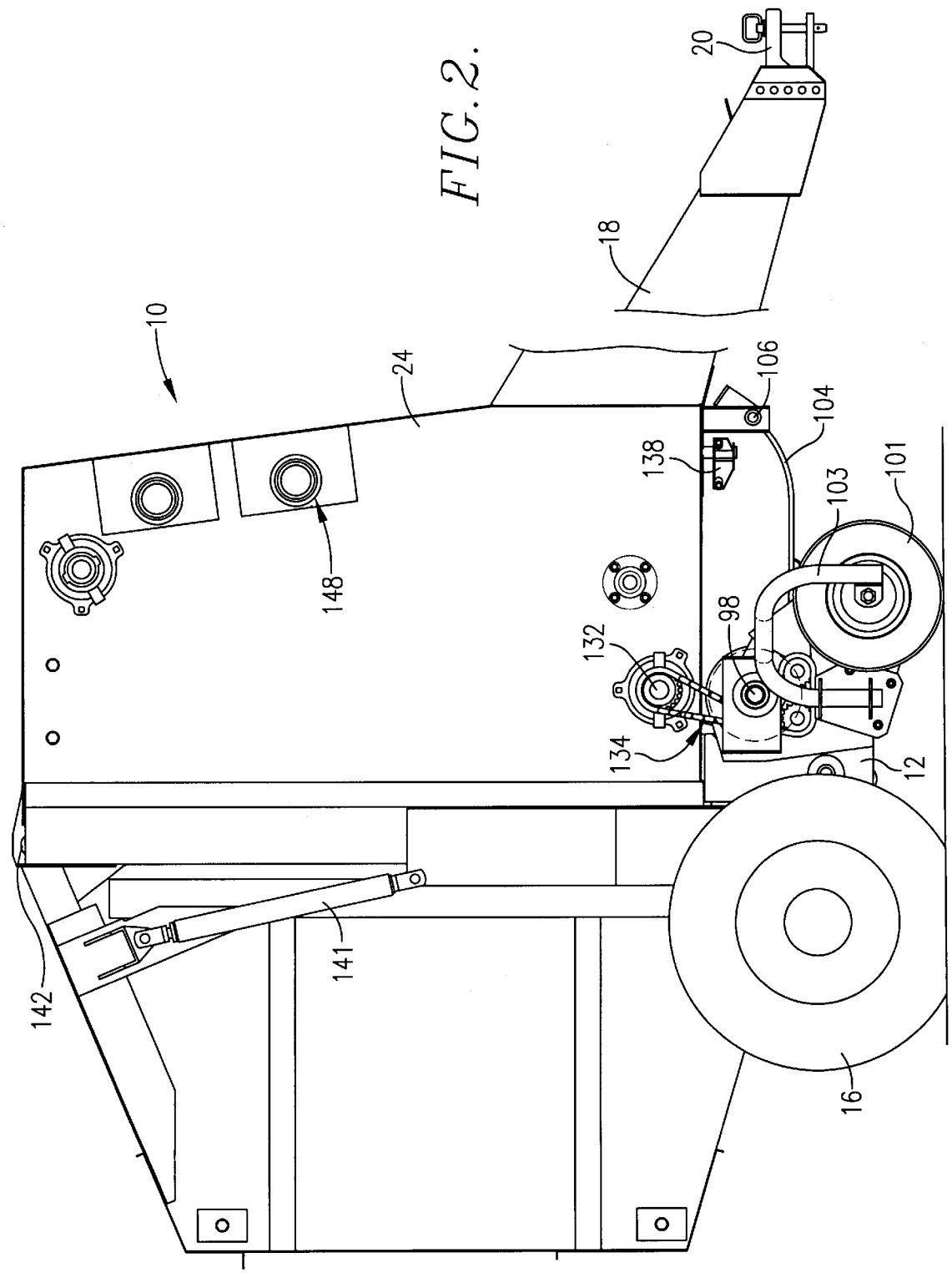
FIG. 2 is a right side elevational view of the baler, particularly illustrating the lack of tensioning mechanisms adjacent the right sidewall of the baler.

As illustrated in FIG. 3, power for operating the components of the baler is delivered by a driveline 110 associated with the tongue 18. The front end of the driveline 110 is adapted for connection to the power take-off shaft (not shown) of the towing vehicle, while the rear end of the driveline 110 is coupled with the input shaft 112 of a right angle gear box 114 on a transverse structural member 116 of the chassis 12. The output shaft 118 of the right angle gear box 114 is coupled with a shaft 120 (FIG. 1) that extends over to the left sidewall 22 where it is journaled for rotation. The shaft 120 projects outwardly beyond the left sidewall 22 where it transfers driving power to the lower drive roll 28 and the upper drive roll 32 via respective chain and sprocket assemblies 122 and 124. As shown in FIG. 1, the stub shaft 126 projecting from the left end of the drive roll 28 is drivingly coupled with the left stub auger of the pair of augers 82 and the rigid tooth feeder 84 via respective chain and sprocket assemblies 128 and 130. As shown in FIG. 2, the stub shaft 132 projecting from the right end of the drive roll 28 is operably coupled with the right stub auger of the pair of augers 82 by a chain and sprocket assembly 134.

When the bale is fully formed within the chamber 26 as illustrated by the bale 136 in solid lines in FIG. 3, it may be wrapped by a suitable wrapper before being discharged from the baler. In the illustrated embodiment, a twine dispenser 138 is located adjacent the front of the baler above the windguard 104 for wrapping the finished bale with twine during the wrapping cycle of the machine. Once wrapped, the bale may be discharged from the baler by operating a pair of lift cylinders 140 and 141 on opposite sides of the machine to elevate the rear half of the sidewalls 22,24 and their associated rolls 42, 44, 46 and 48. The rear half of the machine thus functions as a tailgate that is attached to the front half and pivots relative thereto about an upper pivot 142 at the top of the baler.

TENSION ASSEMBLIES 64 AND 68

As previously indicated, the twin guide roll assembly 64 and slack control assembly 68 are constructed in accordance with the principles of the present invention to impart a pressure evenly across the periphery of the bale without requiring the use of two hydraulic cylinders for each assembly. Turning initially to the twin guide roll assembly 64, the twin guide rolls 50 and 54 ride along the top surface of the bale during the baling cycle, such that the arms 66,67 are urged upwardly by the bale as it increases in diameter (compare the start position of the arms 66,67 shown in phantom in FIG. 3 to the full bale position shown in solid lines in that same figure). Thus, yieldable resistance to upward swinging of the arms 66,67 causes the rolls 50 and 54 to apply pressure against the top surface of the bale during formation. Conventional round balers utilize a pair of tensioning mechanisms, such as hydraulic cylinders, to yieldably resist upward swinging of the arms. As previously indicated, although the use of two cylinders ensures that the twin guide rolls apply pressure evenly across the width of the bale, this duplicity increases baler cost, complexity and maintenance.

In this respect, the inventive twin guide roll assembly 64 includes only one tensioning mechanism in the form of hydraulic cylinder 72. As will subsequently be described, the hydraulic cylinder 72 yieldably resists upward swinging of the arms 66,67 so that the rolls 50 and 54 evenly apply pressure against the top surface of the bale.

In the usual manner, the arms 66 and 67 are mounted to a rotatable, cylindrically shaped torque tube 144 extending between the sidewalls 22 and 24. The arms 66,67 are secured to the tube 144 by suitable means, such as the welds shown in FIG. 5, so that swinging of the arms 66,67 corresponds to rotation of the tube 144. Accordingly, as the arms 66,67 are urged upwardly by the bale as it increases in diameter, the arms 66,67 exert torsional loads on the tube 144 and thereby cause the tube to rotate. The hydraulic cylinder 72 serves to yieldably resist such rotation of the torque tube 144 in the manner described hereinbelow.

In the illustrated embodiment, bearing assemblies 146 and 148 journal the tube 144 adjacent its opposite ends for rotational movement on the sidewalls 22 and 24. As perhaps best shown in FIG. 5, the left bearing assembly 146 includes an outer sleeve 150 welded to a reinforcing plate 152 fixed to the left sidewall 22, and an inner sleeve 154 disposed between the torque tube 144 and outer sleeve 150 for allowing relative rotational movement therebetween. The assembly 146 also includes a locking ring 156 welded to the torque tube 144 outboard of the inner sleeve 154 and cooperating with the arm 66 to prevent axial shifting of the inner sleeve 154 along the torque tube 144. Similar to the left bearing assembly 146, the right bearing assembly 148 includes a stationary outer sleeve 158, an inner sleeve 160 for allowing relative rotation between the outer sleeve 158 and the torque tube 144, and a locking ring 162 cooperating with the arm 67 to prevent shifting of the inner sleeve 160 along the torque tube 144. Of course, the torque tube 144 may be rotatably supported by various other structure without departing from the scope of the present invention.

Figure 4:
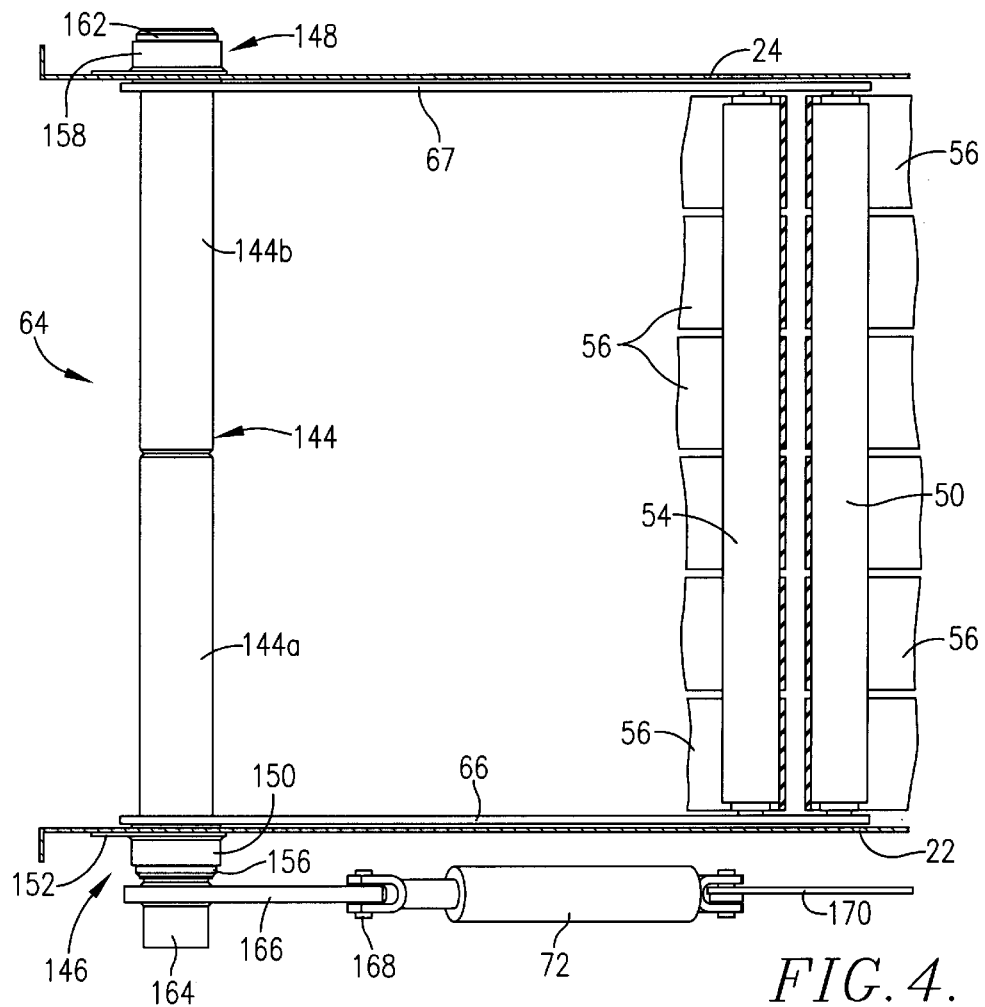
FIG. 4 is a enlarged, fragmentary, generally horizontal cross-sectional view of the twin guide roll assembly taken below the slack control assembly.
Figure 5:
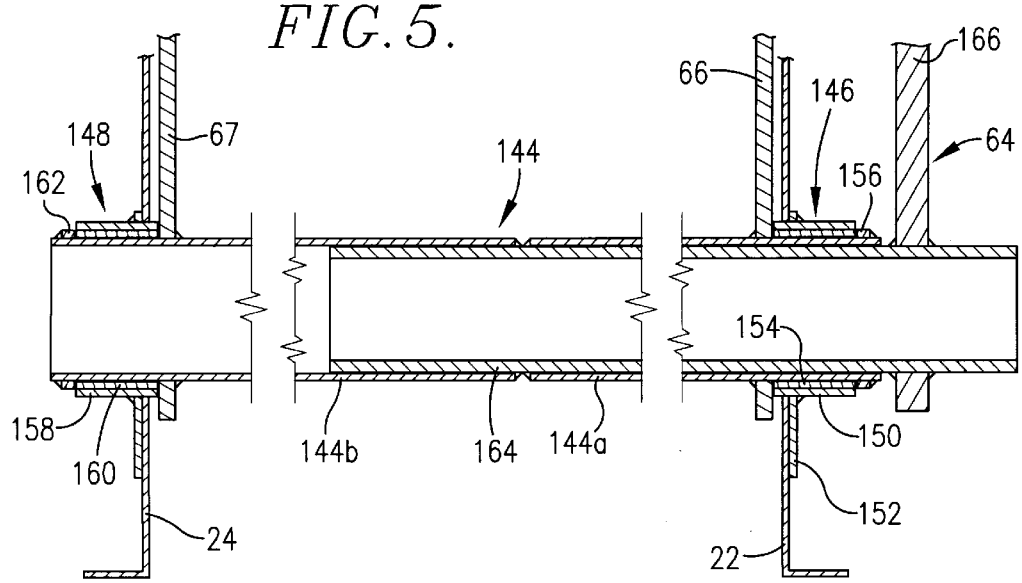
FIG. 5 is an enlarged, fragmentary, generally horizontal cross-sectional view of the torque tube, load-transferring member and related structure of the twin guide roll assembly, particularly illustrating the load-transferring member being received within the torque tube.

As shown in FIGS. 4 and 5, the illustrated torque tube 144 comprises a pair of tubular sections 144a and 144b extending inwardly from respective sidewalls 22 and 24. A cylindrical shaft 164 extends inwardly from the left sidewall 22 and is received within the sections 144a and 144b (see FIG. 5). It will be noted that the shaft projects outwardly beyond the left sidewall 22 and sufficiently inwardly to extend past the center of the baler 10 and into the right tube section 144b. The innermost ends of the tube sections 144a and 144b are connected to the shaft 164 at locations spaced equally from the sidewalls 22 and 24, respectively. In the illustrated embodiment, the sections 144a and 144b are welded to the shaft 164 at generally the center of the baler 10 (see FIG. 4), although the sections may be secured to the shaft at various other locations as long as they are equally spaced from the respective sidewalls. Preferably, the inner surfaces of the sections 144a and 144b slidably engage the outer surface of the shaft 164. Accordingly, with the sections 144a and 144b being secured to the shaft at only the center weld locations, the sections 144a and 144b may twist slightly between the center weld locations and the sidewalls 22 and 24, for purposes which will be described below. If desired, a lubricant port (not shown) may be provided for allowing the farmer to place lubrication between the tube sections 144a, 144b and the shaft 164 to facilitate such twisting.

A crank 166 serves to interconnect the shaft 164 and one end of the hydraulic cylinder 72 so that rotation of the shaft 164, and thereby rotation of the torque tube 144, corresponds with extension and retraction of the cylinder 72. Particularly, the crank 166 is connected to the outer end of shaft 164 by suitable means, such as the welds shown in FIG. 5, and pivotally connected to the cylinder 72 at pivot 168. The opposite end of the hydraulic cylinder 72 is fixed to the left sidewall 22 by a mounting bracket 170 (see FIGS. 1 and 4). Further, the cylinder 72 is preferably connected to a hydraulic circuit (not shown) having a flow restrictor, such as a relief valve, for yieldably restricting hydraulic fluid flow therethrough. In the illustrated embodiment, the cylinder 72 is connected to the circuit so that fluid flow from the cylinder is yieldably restricted as it extends. The cylinder 72 is consequently configured to supply back-pressure or loads that resist swinging of the arms in an upward direction.

The arms 66 and 67 exert torsional loads on the torque tube 144 in a counterclockwise direction when viewing FIG. 1 as the bale grows in diameter. The shaft 164 transfers these torsional loads outwardly to the hydraulic cylinder 72 and thereby urges the cylinder to extend. However, such extension is resisted in the manner described above such that the cylinder 72 provides a yieldable back-pressure or load in opposition to the torsional loads on the torque tube 144. The opposition load provided by the cylinder 72 is transferred to the torque tube 144 by the shaft 164 and is equally supplied to the arms 66 and 67 as a result of the equal spacing between each arm and the respective center weld location defined between the shaft and respective tube section. With upward swinging of the arms 66 and 67 being resisted equally, the rolls 50 and 54 consequently apply pressure evenly across the width of the bale. Accordingly, the twin guide roll assembly 64 serves to apply pressure evenly across the top surface of the bale without requiring two tensioning mechanisms. If for any reason one of the arms encounters an obstruction along the periphery of the bale, or is otherwise caused to swing slightly more than the other arm, the tube sections 144a, 144b are allowed to slightly twist relative to shaft, in the manner described above, for accomodating slight uneven swinging of the arms 66,67.

Although not illustrated in detail, it will be appreciated that the slack control assembly 68 is nearly identical in construction to the twin guide roll assembly 64. Thus, it shall be sufficient to explain that the slack control assembly includes a single hydraulic cylinder 74 pivotally connected between the mounting plate 170 and a crank 172 (see FIG. 1) for yieldably resisting upward swinging of the arms 70. Particularly, the crank 172 couples the cylinder 74 with a load-transferring shaft (not shown) connected to a rotatable torque tube 174 (see FIG. 3) on which the arms 70 are mounted. The shaft is preferably connected to the torque tube 174 at a location spaced equally between the sidewalls 22 and 24 so that the opposition back-pressure or load provided by the hydraulic cylinder 74 is supplied evenly to the arms 70. It will be noted that the rolls 34 and 38 carried by the arms 70 do not apply pressure directly against the periphery of the bale, but rather the assembly 68 serves to resist the paying out of slack so as to tension the belts 56. Accordingly, the slack control assembly 68 indirectly applies pressure against the bale by tensioning the belts 56.

It will be appreciated that the principles of the present invention are equally applicable to other types of tension assemblies. That is, it is entirely within the ambit of the present invention to utilize the inventive tension assembly on various other baler constructions. For example, a number of balers include a series of transverse rolls supported in a generally vertically stacked, side-by-side relationship, with each stack of rolls being swingable away from the upright or vertical starting condition to expand the baling chamber as the bale grows larger. Some balers utilize a combination of belts and rolls. In any case, the swingable movement of the stack of rolls may be yieldably resisted according to the principles of the present invention.

OPERATION

At the beginning of each new bale forming cycle, the empty baling chamber 26 is generally upright and triangular as shown in phantom lines in FIG. 3. As the baler is pulled across the field, the rotary rake tine assembly 78 picks up crop from the ground for delivery to the feeder 84. The center-gathering stub augers 82 serve to converge crop centrally from areas outboard of the feeder 84 so that all of the picked up crop is flung rearwardly into the chamber 26 by the feeder 84. The oppositely moving belt stretches 60 and 62 lift the incoming material at the rear and lower it at the front so as to impart a forward tumbling and coiling action to the material. Eventually, a bale core is formed between the belt stretches 60 and 62. It will be noted that the formation of the core takes place without the usual starter roll. As material continues to be fed into the chamber 26, the core starts to grow and deflects the belt stretches 60,62 in opposite fore-and-aft directions. As previously indicated, the slack control assembly 68 yieldably resists paying out of slack such that the belts 56 apply pressure against the periphery of the bale core as it causes the belt stretches 60 and 62 to deflect. Further, the twin guide roll assembly 64 imparts pressure against the top surface of the bale core by resisting upward swinging of the arms 66 and 67, as previously described. Eventually, the bale grows so much that it assumes the configuration of the bale 136 in FIG. 3, which is ready for wrapping and ejection.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the tensioning mechanism may be variously constructed. That is, the principles of the present invention are equally applicable to structure other than hydraulic cylinders for resisting rotation of the torque tube, such as springs.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. In a round baler having a pair of laterally spaced sidewalls between which bale formation occurs, an improved tension assembly comprising:

a rotatable torque bar extending between the sidewalls;

a single tensioning mechanism adjacent one of the sidewalls for supplying a yieldable resistance load in opposition to torsional loads on the torque bar so as to yieldably resist rotation of the bar;

a load-transferring member extending inwardly from said one sidewall to operably connect the single tensioning mechanism to the torque bar at a location spaced between the sidewalls and thereby transfer the loads between the mechanism and bar.

2. In a round baler as claimed in claim 1, said torque bar being rotatably mounted to the sidewalls and connected to the load-transferring member at a location spaced equally between the sidewalls.

3. In a round baler as claimed in claim 1, said torque bar being tubular.

4. In a round baler as claimed in claim 3, said load-transferring member being received within the torque bar.

5. In a round baler as claimed in claim 1, said torque bar comprising a pair of sections extending inwardly from respective ones of the sidewalls and being connected to the load-transferring member at locations spaced equally from the respective sidewalls.

6. In a round baler as claimed in claim 5, each of said sections having a cylindrical, tubular shape, said load-transferring member having a corresponding cylindrical shape and being received within each of the sections.

7. In a round baler as claimed in claim 6, said sections being spaced radially outwardly from the load-transferring member so as to allow slight torsional twisting of the sections between said locations and said sidewalls.

8. In a round baler as claimed in claim 6, said single tensioning mechanism comprising an extendable and retractable device having one end coupled with the load-transferring member and an opposite end fixed relative to said one sidewall, such that extension and retraction of the device corresponds with rotation of the torque bar.

9. In a round baler as claimed in claim 8, said extendable and retractable device comprising a hydraulic cylinder.

10. In a round baler as claimed in claim 9; and a hydraulic circuit having a flow restrictor for yieldably restricting flow therethrough, said cylinder being connected to the circuit such that extension or retraction of the cylinder is yieldably restricted.

11. In a round baler as claimed in claim 10; and structure carried by the torque bar for imparting pressure against the bale as rotation of the bar is resisted.

12. In a round baler as claimed in claim 11, said structure including a pair of arms projecting from the torque tube and a plurality of rolls rotatably mounted between the arms, such that swinging of the arms is yieldably resisted by the cylinder.

13. In a round baler as claimed in claim 12, said arms being spaced equally from respective ones of said sidewalls.

14. In a round baler as claimed in claim 1, said single tensioning mechanism comprising an extendable and retractable device having one end coupled with the load-transferring member and an opposite end fixed relative to said one sidewall, such that extension and retraction of the device corresponds with rotation of the torque bar.

15. In a round baler as claimed in claim 14; and a crank interconnecting said load-transferring member and said one end of the extendable and retractable unit.

16. In a round baler as claimed in claim 14, said extendable and retractable device comprising a hydraulic cylinder.

17. In a round baler as claimed in claim 16; and a hydraulic circuit having a flow restrictor for yieldably restricting flow therethrough, said cylinder being connected to the circuit such that extension or retraction of the cylinder is yieldably restricted.

18. In a round baler as claimed in claim 17, said flow restrictor comprising a relief valve.

19. In a round baler as claimed in claim 1; and structure carried by the torque bar for imparting pressure against the bale as rotation of the bar is resisted.

20. In a round baler as claimed in claim 19, said structure including a pair of arms projecting from the torque tube and a plurality of rolls rotatably mounted between the arms, such that swinging of the arms is yieldably resisted by the single tensioning mechanism.

21. In a round baler as claimed in claim 20, said baler including a plurality of laterally spaced apart belts between the sidewalls forming a baling chamber within which bales are formed, said rolls being entrained by the belts.

22. In a round baler as claimed in claim 1, said load-transferring member being tubular.

\* \* \* \* \*